3,637,829
LIQUID PHASE OXIDATION OF MONONUCLEAR AROMATIC COMPOUNDS

Ralph O. Kerr, Houston, Tex., asisgnor to Petro-Tex Chemical Corporation, Houston, Tex.
No Drawing. Filed May 8, 1968, Ser. No. 727,668
Int. Cl. C07c 63/02
U.S. Cl. 260—524 R      17 Claims

ABSTRACT OF THE DISCLOSURE

A process for the oxidation of mononuclear aromatic compounds having at least one oxidizable group selected from methyl, hydroxymethyl, and aldehyde, in the presence of oxygen, cobaltous or cobaltic ions and selenium at an elevated temperature, and at atmospheric pressure or greater.

BACKGROUND OF THE INVENTION

This invention relates to an improved method for the oxidation of aromatic compounds characterized by a single aryl group having at least one oxidizable group selected from methyl, hydroxymethyl, and aldehyde. More particularly, the invention relates to an improved process for the efficient and economical conversion of suitable methyl and dimethyl substituted monoaryl compounds to aromatic monobasic and dibasic acids.

Previous studies in this field have evolved a variety of proposed processes for the catalytic liquid phase oxidation of alkylated aromatic compounds in the presence or absence of a solvent by means of air or oxygen using various metals or salts thereof as catalysts. A variety of organic compounds such as peroxides, aldehydes, and ketones, have been proposed and utilized as reaction initiators or activators, and at least one commercial process employs bromine or bromides as catalytic aids.

U.S. Pat. 3,299,125 discloses the use of metals having a valence greater than one and a single valence state as effective co-catalysts with cobaltous or cobaltic ions for the conversion of specified aromatic compounds to aromatic carboxylic acids. The patent discolses additionally that certain other elements may be used in conjunction with the Co and single valence materials, and that these elements may somewhat increase the activity of these catalysts. In each case however, the presence of a single valence material is required as a fundamental co-catalyst.

One object of the present invention is the provision of a novel process for the economical and efficient conversion of aromatic compounds to useful oxidation products such as toluic acid, terephthalic acid, and various other compounds. More particularly, the present invention has for its object a process for the oxidation of aromatic compounds in the absence of metal ions of metals having but a single valence. The above and other objects are accomplished in accordance with this invention by carrying out the reaction with the materials and the operating conditions hereinafter described. All parts are by weight unless specified otherwise.

SUMMARY OF THE INVENTION

Broadly, the invention comprises reacting a monoaryl compound containing at least one oxidizable group selected from methyl, hydroxymethyl, and aldehyde with oxygen in the absence or substantial absence of a metallic ion of metals having but a single valence, in a solvent at an elevated temperature at atmospheric pressure or greater, and in the presence of a catalytically active or effective amount of cobaltous ion, cobaltic ion, or mixtures thereof, and effective or co-catalytic amounts, as more particularly hereinafter described, of selenium ion. More particularly, the invention comprises a process for the oxidation of compounds of the type described in an inert medium or solvent at a temperature of from about 60° C. to about 160° C. or 170° C. at atmospheric pressure or greater, in the absence or substantial absence of a metal ion as aforedescribed, and in the presence of from about 0.3 to 24 grams per liter cobaltous or cobaltic ion, or mixtures thereof and a co-catalytically active or effective amount of selenium ion.

PREFERRED EMBODIMENTS

In its preferred form the invention comprises a process for the oxidation of methyl or dimethyl substituted monoaryl compounds in the absence or substantial absence of a metallic ion of metals having but a single valence, in a solvent with oxygen at a temperature of from about 60° C. to about 170° C. at atmospheric pressure or greater, and in the presence of from 0.3 to 24 grams per liter cobaltous or caltic ion, or mixtures thereof, and a co-catalyst comprising or consisting essentially of from about 0.13 gram per liter to about 1.6 grams per liter of selenium ion. The term "substantial absence" is used in recognition of the fact that it is virtually impossible to exclude all impurities form a given sample of catalytic material by conventional purification techniques.

As may be seen, the process of the invention is applicable to a wide variety of materials. Typical starting materials include toluene, p-xylene, m-xylene, hydroxymethyl benzene (benzyl alcohol) and benzaldehyde, or mixtures containing such compounds. The aromatic starting material may contain, in addition to the specific group or groups, other nuclear substituents inert to the oxidation reaction, such as chlorine, bromine, fluorine, nitro, carboxyl, alkoxy, aryloxy, or tertiary alkyl groups. Typical conversions include toluene to benzoic aicd, m-xylene or m-toluic acid to isophthalic acid, p-xylene or p-toluic acid to terephthalic acid, 1,4-dimethyl-2-chlorobenzene to chloroterephthalic acid, and 1,4-dimethyl-2-nitrobenzene to nitroterephthalic acid. Additional conversions attainable by the present invention include conversion of terephthaldehyde and p-tolualdehyde to terephthalic acid, and isophthalic aldehyde to isophthali cacid. Although no particular concentrations of the monoaryl compound are required, in practice concentrations of from about 0.3 mol per liter to about 4.5 mols per liter, based on the total amount of solution present, are suitable. Concentrations from about 0.8 to about 4.0 mols per liter are preferred.

As noted above, either cobaltous or cobaltic ion (or both) should be present in amount corresponding to the initial provision of a cobalt salt soluble in the above solution, such as cobaltous acetate, propionate, or butyrate, to the extent of about 0.3 to 24 grams of cobaltous or cobaltic ions per liter of solution, although an amount of from about 0.4 to 17 grams is preferred. Thus, with the use of a 1 molar solution of the starting aromatic compound in acetic acid, the desired cobalt concentration may be supplied by the initial provision of about 0.03 to 0.20 mol of cobaltous acetate per liter of solution. Examples of cobaltous compounds which may be utilized are $Co(OAC)_2 \cdot 4H_2O$, cobaltous chloride, cobaltous acetylacetonate, etc., while cobaltic compounds are exemplified by cobaltic acetylacetonate and cobaltic acetate.

A small amount of water is preferred in the system, e.g., 0.001 to 0.02 mol per liter of the monocarboxylic acid media, more particularly hereinafter described, in order to reduce the induction period and to insure complete solubility of the cobalt compound. Water need not be used with the acetylacetonates. The water may be introduced directly or by use of hydrated materials.

Suitable temperatures for the oxidation process in accordance with this invention are within the range of 60°

C. or 70° C. to about 150° C. at atmospheric pressure, although temperatures up to about 170° C. may at times be used, with somewhat elevated pressures, such as up to about 100 atmospheres and more. The preferred operating temperatures are within the range of 90° C. to 135° C.

While air is the most economical source of oxygen, any suitable oxygen-containing gas such as pure oxygen, ozone, or mixture of such gases with inert gaseous diluents may be employed. It will, of course, be understood that in oxidizing substituted aromatic compounds in accordance with the invention, the oxygen supplied by continuous introduction of air or other oxygen-contatinining gas, as explained above, is the fundamental source of oxygen for the oxidation reaction, and sufficient oxygen must be supplied to complete the reaction.

As noted, it has been found that compounds containing the element selenium are effective, in conjunction with the cobaltous or cobaltic ions, in improving yields of the desired products. The particular compound of Se utilized is not greatly significant as long as sufficient ions are released in solution to give the co-catalytic amount. Compounds of Se which may be employed are selenous acid, selenic acid, selenium dioxide, selenium tetrabromide, and selenium sulfur oxide, and the like. The amount of Se ion employed is critical and the Se ion should be present in amount of from about 0.13 to about 1.6 grams per liter, based on the total solution present, with from about 0.153 gram per liter to about 1.53 grams per liter being suitable. A preferred amount is from about 0.306 to about 1.38 gram per liter.

The choice of solvent is not critical as long as the solvent is inert to the reactants or the products under the oxidative conditions of the system, or is oxidized to materials which are inert to the reactants or products. Preferred media for carrying out the reaction in the range set forth, as described above, are the monocarboxylic acids selected from the group consisting of aliphatic acids having 2 to 6 carbon atoms, mixtures thereof, and aryl aliphatic acids having from 8 to 12 carbon atoms, and mixtures thereof. Acetic acid is preferred, although such media as propionic, butyric, trimethyl acetic, phenyl acetic and the like, may be used.

Although not required, catalytic aids and "initiators" may be employed to aid in the attack on the hydrocarbon molecule, especially at lower temperatures. It has been found for example, that small amounts, i.e., co-catalytic or effective amounts of various multivalent metal ions such as vanadium ion, e.g. 0.01 gram per liter to 1.5 gram per liter; tellurium ion, e.g., .01 gram per liter to 0.8 gram per liter; and uranium ion, e.g., 0.02 gram per liter to 0.84 gram per liter, markedly improve the yield of the oxidation product. The preferred initiators are aldehydes and ketones such as paraldehyde, acetaldehyde, and methyl ethyl ketone. In general, aldehydes and ketones of 3 to 10 carbon atoms are suitable. The aldehydes, propionaldehyde, tolualdehyde and isobutyraldehyde, and the ketones diethyl ketone, methyl propyl ketone, and 2,5 hexanedion are particularly effective. Although the concentration is not critical, the initiator, when utilized, is present at the beginning of the reaction or is added incrementally in a total amount usually from about 0.01 mol per liter to about 0.5 mol per liter of solution. The initiator may also be added after the fashion described in U.S. application Ser. No. 617,803, to Barone, filed Feb. 23, 1967, wherein the initiator, or the major portion thereof, is added during the period in the course of the reaction that the reaction experiences its maximum rate of oxidation or oxygen uptake.

EXAMPLE I p-Xylene is combined with acetic acid in a total amount sufficient to make a solution of about 2.18 mols per liter of p-xylene (unreacted) and sufficient cobalt acetate-tetrahydrate and selenious acid are combined therewith to give total concentrations of about 10.1 grams per liter cobaltous ion and about 0.5 gram per liter selenium ion, respectively. The reactor is provided with suitably valved gas inlet and outlet lines for the admission of air. The temperature of the reactor is held at 128° C., and the reaction is carried out under a pressure of about 51 atmospheres for about 8 hours. The product terephthalic acid is separated by filtration.

EXAMPLE II

The procedure of Example I is repeated except that the reaction time is shortened to 2.5 hours, the last hour of which the reaction is conducted at 160° C., and sufficient acetaldehyde is added to the system to give a concentration of about 0.3 mol per liter of solution. Terephthalic acid is recovered in yield of about 78.9 percent.

EXAMPLE III

The procedure of Example II is repeated except that the selenious acid is added in an amount sufficient to give 0.6 gram per liter selenium ion, and the temperature is held originally at 120° C. Terephthalic acid is recovered in a yield of about 76.4 percent.

EXAMPLE IV

The procedure of Example II is repeated except that selenium is added as $SeO_2$ in an amount to give about 0.6 gram per liter Se ion, and $V_2O_5$ is added in sufficient amount to give 0.05 gram per liter vanadium ion. The yield of terephthalic acid is approximately 85.4 percent.

EXAMPLE V

The procedure of Example IV is repeated except that the selenium ion is supplied as $SeO_2$ rather than as selenious acid, and the vanadium ion concentration is raised to 0.2 gram per liter. The yield of terephthalic acid is approximately 83.9 percent.

EXAMPLE VI

The procedure of Example II is repeated, except that Se ion is added as $SeO_2$ in an amount to give about 0.6 gram per liter Se ion, and $TeO_2$ is added in an amount to give about 0.08 gram per liter of Te ion. The yield of terephthalic acid is approximately 83.7 percent.

I claim:

1. A process for oxidizing monoaryl compounds containing at least one member selected from the group consisting of methyl, hydroxymethyl, and aldehyde, comprising contacting about 0.3 to about 4.5 mols per liter, based on the total amount of solution present of said monoaryl compound with oxygen in the substantial absence of a metal ion of metallic elements having but a single valence, in solvent selected from the group consisting of aliphatic acids having 2 to 6 carbon atoms, mixtures thereof and aryl aliphatic acids having 8 to 12 carbon atoms, and mixtures thereof, and in the presence of from about 1.0 to about 24 grams per liter of a member selected from the group consisting of cobaltous ion, cobaltic ion, and mixtures thereof; from about 0.12 gram per liter to about 1.6 grams per liter of selenium ion in solution, said contacting being carried out at a temperature of from about 60° C. to about 170° C. and at atmospheric pressure or greater.

2. The process of claim 1 wherein the monoaryl compound is present in an amount of from about 0.8 mol per liter to about 4.0 mols per liter, based on the total amount of solution.

3. The process of claim 2 wherein the member selected from the group consisting of cobaltous ion, cobaltic ion, and mixtures thereof, is present in an amount of from about 1.0 to about 17 grams per liter.

4. The process of claim 3 wherein the solvent is an aliphatic acid having 2 to 6 carbon atoms and the selenium ion is present in an amount of from 0.153 gram per liter to 1.53 grams per liter.

5. The process of claim 4 wherein the temperature is from 70° C. to 135° C.

6. The process of claim 5 wherein the monoaryl compound is p-xylene.

7. The process of claim 6 wherein there is present 0.001 to 0.02 mol per liter of water, and the selenium ion is present in an amount of from about 0.306 gram per liter to about 1.38 grams per liter.

8. The process of claim 7 wherein vanadium ion is present in a cocatalytically effective amount.

9. The process of claim 1 wherein there is present from about 0.10 to about 0.5 mol per liter of a ketone or an aldehyde.

10. The process of claim 9 wherein the member selected from the group consisting of cobaltous ion, cobaltic ion, and mixtures thereof, is present in an amount of from about 1.0 to about 17 grams per liter.

11. The process of claim 10 wherein the monoaryl compound is present in an amount of from about 0.8 mol per liter to about 4.0 mols per liter, based on the total amount of solution present.

12. The process of claim 11 wherein the monoaryl compound is p-xylene, and the solvent is an aliphatic acid having 2 to 6 carbon atoms.

13. The process of claim 12 wherein there is present 0.001 to 0.02 mol per liter of water.

14. The process of claim 13 wherein the initiator is selected from the group consisting of acetaldehyde, paraldehyde and methyl ethyl ketone.

15. The process of claim 14 wherein vanadium ion is present in an amount of from about 0.01 gram per liter to about 1.5 grams per liter.

16. A process for oxidizing monoaryl compounds containing at least one member selected from the group consisting of methyl, hydroxymethyl, and aldehyde, comprising contacting about 0.3 to about 4.5 mols per liter, based on the total amount of solution present of said monoaryl compound with oxygen in the substantial absence of a metal ion of metallic elements having but a single valence, in solvent selected from the group consisting of aliphatic acids having 2 to 6 carbon atoms, mixtures thereof and aryl aliphatic acids having 8 to 12 carbon atoms, and mixtures thereof, and in the presence of from about 1.0 to about 24 grams per liter of a member selected from the group consisting of cobaltous ion, cobaltic ion, and mixtures thereof; from about 0.12 gram per liter to about 1.6 grams per liter of selenium ion in solution, a cocatalytically active amount of Te ion in solution, said contacting being carried out at a temperature of from about 60° C. to about 170° C. and at atmospheric pressure or greater.

17. A process for oxidizing p-xylene comprising contacting from about 0.8 mol per liter to about 4.0 mols per liter, based on the total amount of solution present of said p-xylene with oxygen in the substantial absence of a metal ion of metallic elements having but a single valence, in a solvent which is an aliphatic acid having 2 to 6 carbon atoms in the presence of from about 1.0 to about 17 grams per liter of a member selected from the group consisting of cobaltous ion, cobaltic ion, and mixtures thereof; and from about 0.12 gram per liter to about 1.6 grams per liter of selenium ion in solution, and from about 0.01 to about 0.5 mol per liter of an initiator selected from the group consisting of acetaldehyde, paraldehyde and methyl ethyl ketone, said contacting being carried out at a temperature of from 70° C. to 170° C. at 1 to about 100 atmospheres in the presence of 0.001 to 0.02 mol per liter of water and a catalytically effective amount of Te ion.

References Cited
UNITED STATES PATENTS

| | | | |
|---|---|---|---|
| 1,284,887 | 11/1918 | Gibbs | 260—524 |
| 2,559,147 | 7/1951 | Emerson et al. | 260—524 |
| 2,853,514 | 9/1958 | Brill | 260—524 |
| 2,920,106 | 1/1960 | Mills | 260—524 |

LORRAINE A. WEINBERGER, Primary Examiner

R. S. WEISSBERG, Assistant Examiner

U.S. Cl. X.R.

260—523 A